Jan. 14, 1958  F. K. DU PRÉ  2,820,200
WAVEGUIDE MODULATOR
Filed Nov. 4, 1954

INVENTOR.
FRITS KAREL DU PRÉ
BY
AGENT

United States Patent Office 2,820,200
Patented Jan. 14, 1958

2,820,200

WAVEGUIDE MODULATOR

Frits Karl du Pré, White Plains, N. Y., assignor to North American Philips Company, Inc., New York, N. Y., a corporation of Delaware Application November 4, 1954, Serial No. 466,730

7 Claims. (Cl. 332—51)

This invention relates to modulators for producing amplitude modulation of electromagnetic waves in a waveguide, and more particularly to modulators for producing amplitude modulation of such waves in a rectangular waveguide system by means of rotation of the plane of polarization of polarized waves.

In previously known apparatus for amplitude-modulating electromagnetic waves in a rectangular waveguide system by means of rotation of the plane of polarization of the waves, use is made of a section of circular waveguide inserted in the path of the waves to be modulated. A wave-rotation element is positioned in the circular waveguide section and is capable of rotating the plane of polarization of the waves in accordance with desired modulation. The waves to be modulated are fed, from a rectangular waveguide in which the waves are inherently polarized in well-known manner, into the circular waveguide section wherein the wave-rotation element rotates the polarized wave the desired amount, the angle of rotation usually being less than 90 degrees. The rotated polarized wave, after passing through the remaining portion of the circular waveguide, is then fed to a rectangular waveguide which accepts only the vector component of the rotated wave which corresponds with the polarization orientation of the last-named waveguide. By connecting a source of modulation signals to actuate the wave-rotation element, the amount of rotation is varied and amplitude modulation of the electric waves is achieved. The wave-rotation element commonly used comprises, for example, a non-conductive ferromagnetic material such as a ferrite positioned within the circular waveguide section and surrounded, on the outside of the circular waveguide section, by a coil connected to receive the modulation signals and which produces a magnetic field in the ferromagnetic material which varies in accordance with the modulation signals. The ferromagnetic material causes rotation of the plane of polarization of the electric waves by an angular amount in accordance with the strength of the magnetic field. A fixed magnetic field is customarily provided in the wave-rotation element by means of magnets positioned externally of the waveguide, thus providing a fixed reference angle of rotation about which the plane of polarization may be rotated in the "plus" and "minus" directions in accordance with the modulation signals.

An object of the invention is to provide apparatus for modulating waves in a rectangular waveguide by means of rotation of the plane of polarization of polarized waves, without the necessity of employing a section of circular waveguide.

Other objects are to provide a system for modulating waves in a rectangular waveguide which is more economical, more simple, and more compact than such devices known in the prior art. Still other objects will be apparent.

The invention makes use of the discovery that, contrary to the prior art concepts which teach that the plane of polarization of polarized waves can be rotated in a waveguide only if a circular waveguide is used, it is possible to achieve rotation of polarized waves in a rectangular waveguide provided the condition is met that the wave-rotation element fills a major portion of the interior cross-section area of the waveguide. This discovery is all the more surprising in view of the fact that one skilled in the art would expect that corner effects of the rectangular waveguide would interfere with or prevent a proper rotation of the plane of polarization of the polarized waves. The invention also provides a zero reference level for the modulated waves, achieved by providing a fixed value of magnetic field in the wave-rotation element by the use of a permanently magnetized material, which is transparent to electromagnetic waves, and which is positioned within the waveguide adjacent the wave-rotation element.

Figure 1:
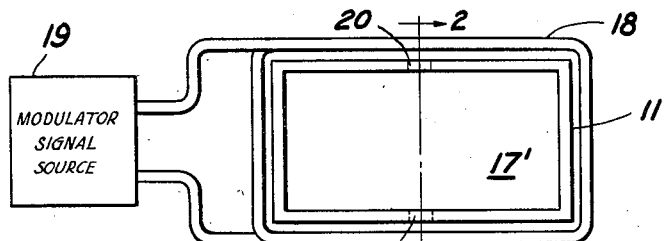
Fig. 1 is a view of a rectangular waveguide, looking toward an end thereof, in which a preferred embodiment of the invention is incorporated.
Figure 2:
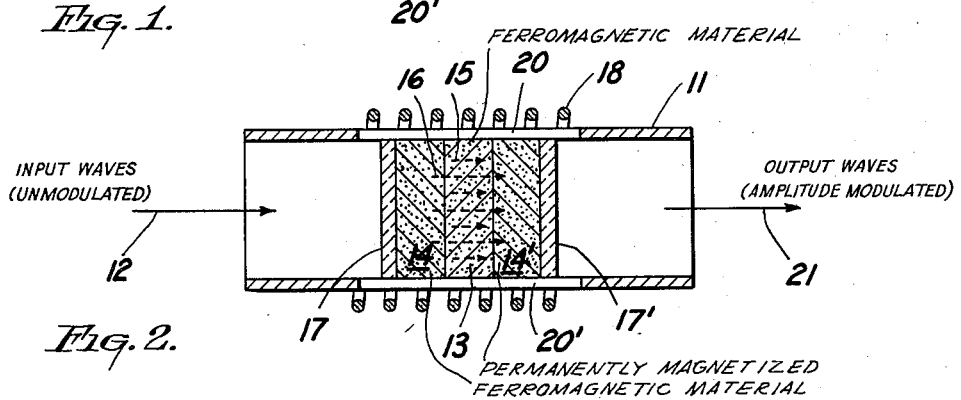
Fig. 2 is a longitudinal cross-sectional view taken on the line 2—2 of Fig. 1.

Now referring to the preferred embodiment of the invention shown in Figs. 1 and 2, there is provided a rectangular waveguide 11 having the usual electrically conductive walls of non-magnetic material such as copper, brass, silver, or the like. Input electromagnetic waves 12 are fed into the waveguide 11 by suitable means (not shown) such as an oscillator which may be coupled to the waveguide 11 by conventional means such as another waveguide or a coupling probe or loop.

A wave-rotation element 13 is positioned within the waveguide 11. The element 13 must fill a major portion of the cross-section area of the waveguide 11, and preferably substantially fills the entire cross-section area thereof. The element 13 comprises an electrically non-conductive material having the property of rotating the plane of polarization of electric waves, and is known in the art as ferromagnetic material such as a ferrite. Suitable ferrites are compositions of one or more oxides of certain bivalent metals and ferric oxide which have been sintered to produce a material having very low losses at microwave frequencies. Suitable bivalent metals are Mn, Co, Ni, Cu, Mg, Zn, and Cd. These materials have been fully described in U. S. Patents Nos. 2,452,529; 2,452,530; 2,452,531; 2,551,711; and 2,579,978; in a monograph by J. L. Snoek, "New Developments in Ferromagnetic Materials," in 1947; and in Philips Technical Review, vol. 13, No. 7 (January 1952), pp. 181–193. These materials have the property, when placed in a magnetic field, of rotating the plane of polarization of polarized electromagnetic waves which are passed therethrough in a direction in alignment with the lines of magnetic force. Preferred ferrites to be used in carrying out the invention are composed of $NiOFe_2O_3$, or $NiZnFe_2O_4$, in which the molar percentages are about 48 NiO, 1.0 ZnO, and 51 $Fe_2O_3$.

A permanent magnet 14 is positioned within the waveguide 11 adjacent one side of the wave-rotation element 13. Another permanent magnet 14', similar to the magnet 14, is positioned within the waveguide 11 adjacent the other side of the wave-rotation element 13, as shown. The permanent magnets 14, 14' produce a fixed magnetic field, indicated by the short dotted lines 15, in the wave-rotation element 13, in the direction of the major axis of the waveguide. The permanent magnets 14, 14' comprise a permanently magnetized electrically non-conductive ferromagnetic material.

Suitable electrically non-conductive ferromagnetic permanent magnet materials are fully described in U. S. Patents 2,762,777 and 2,762,778, both of which were issued on September 11, 1956. These materials are characterized by a composition substantially consisting of non-cubic crystals consisting principally of a composite oxide of iron and of at least one of the metals barium, strontium and lead, and, alternatively, a small amount of calcium as a partial substitute for one of the latter metals. A preferred material comprises $BaO \cdot 6Fe_2O_3$. Another suitable material is a cobalt ferrous ferrite material.

Layers 17 and 17' of glass are attached to the outer surfaces of the magnets 14 and 14', as shown, in order to reduce reflections of the waves when they pass from the permanent magnets into air and vice versa. Other materials for constituting the layers 17 and 17' are well-known. The glass layers 17, 17' have a thickness of about ¼ the wavelength of the waves to be modulated, and have a dielectric constant equal to the square root of the dielectric constant of the material to which it is attached, as is described by H. G. Beljers in Philips Research Reports, vol. 9, No. 2 (April 1954), pp. 136–137.

A coil 18 is positioned around the waveguide 11 in the vicinity of the wave-rotation element 13, and is connected to a modulator signal source 19 which energizes the coil 18 to provide a magnetic field, indicated by the long dotted lines 16, in the wave-rotation element 13 which is in alignment with the fixed field 15 and which varies in accordance with the modulation signals provided by the source 19. Longitudinal slits 20, 20' are provided in the walls of the waveguide 11 to reduce eddy currents. Other known means for reducing eddy currents also may be used.

The input electromagnetic waves 12 pass through the wave-rotation device 13 and associated magnets 14, 14' with a small amount of inherent attenuation due to losses, and, due to the effects of rotation of the polarization of the waves in the element 13 in accordance with desired modulation, combined with the selective polarization characteristic of the waveguide 11, are changed into amplitude modulated output waves 21.

Figure 3:
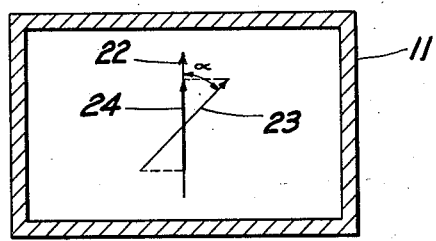
Fig. 3 is a vector diagram, shown in relation to a rectangular waveguide, which indicates the mode of operation of the invention.

The operation of the invention will be more readily understood by considering the vector diagram shown in Fig. 3, in which the vector 22 represents the polarized direction and relative amplitude of the input waves 12. The direction of polarization shown is achieved inherently in the waveguide 11 when operated in the well-known $TE_{10}$ mode. The waves 12 pass through the permanent magnets 14, 14' and glass layers 17, 17' substantially unaffected except for a slight loss in amplitude. When the waves 12 are passing through the wave-rotation element 13 under the influence of the fixed magnetic field 15, their plane of polarization is rotated a total amount $\alpha$, and the polarization-rotated waves emerge or attempt to emerge from the wave-rotation device 13 with the plane of polarization rotated by an amount $\alpha$ with respect to the plane of polarization of the input waves 12. The vector 23 in Fig. 3 represents the amplitude and rotation of the rotated plane of polarization of the waves. The amplitude of the rotated vector 23 is slightly less than that of the unrotated vector 22, due to losses. The vector component 24 of the vector 23 which is in alignment with the inherent polarization characteristic of the waveguide 11, as indicated by the input wave vector 22, is accepted by the waveguide 11 and provides the modulated output waves 21.

If the material 13, the thickness thereof, and the strength of the fixed magnetic field 15 are chosen to provide a fixed reference angle of rotation $\alpha$ of approximately 45 degrees, then the reference of quiescent power of the output waves 21, as indicated by the vector 24, will be approximately half the power of the input waves 12 as indicated by the vector 22, in the absence of modulation signals from the signal source 19. Under these conditions, an appreciable amount of modulation can be obtained with good linearity.

The use of two permanent magnets 14, 14' provides a uniform fixed magnetic field 15 in the wave-rotation element 13; however, satisfactory results are obtained if one of these magnets is omitted and the other magnet made sufficiently large to provide the required magnitude of fixed field 15. The use of one or two permanent magnets as described is a highly efficient way to provide the fixed field 15, because these magnets are positioned inside the waveguide and adjacent the wave-rotation element 13. This achievement is made possible by the use of non-conductive wave-transparent material for the magnets, i. e., the electric waves can pass through the magnets with very little attenuation.

Figure 4:
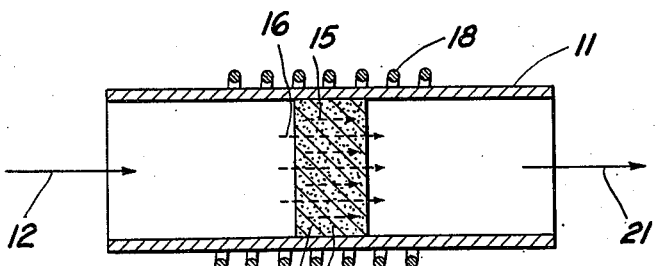
Fig. 4 is a longitudinal cross-sectional view of an alternative embodiment of the invention.

Fig. 4 shows an alternative arrangement which is preferred for use with electromagnetic waves 12 having a relatively high frequency of, for example, 25,000 megacycles or higher. A single element 25 of permanently magnetized non-conductive ferromagnetic material such as, for example, that described above, is positioned to substantially fill the cross-sectional area of the waveguide 11 in the vicinity of the coil 18. The element 25 causes rotation of the plane of polarization of the waves 12 in accordance with current in the coil 18, in addition to providing a fixed reference-angle of rotation due to the self-contained magnetic field 15, thereby producing amplitude-modulated output waves 21. The glass windows 17 and 17', and slots 20, 20' shown in Fig. 2, can be used in the embodiment of Fig. 4, if desired, to reduce wave reflections and eddy current losses.

In the above description, the term "rectangular waveguide" is to be understood to include the use of any substantially rectangular waveguide in which the waves are polarized in the manner described. The wave-rotation element 13 must fill most of, but need not completely fill, the cross-sectional area inside the waveguide 11. Satisfactory results are obtained if the element 13 occupies at least about 50% of the central region of the waveguide cross-sectional area. In the embodiment of Fig. 2, the permanent magnets 14 and 14' preferably cover the entire areas of the wave-input and wave-output surfaces of the element 13. If variable modulation is not desired, the source of variable magnetization, comprising the coil 18 and signal source 19, may be eliminated. The resulting structure will be, in effect, a fixed attenuator of the waves 12. The invention may be used as a microwave switch, by omitting the fixed magnetic field 15 and causing the variable magnetic field to selectively have a value of zero or a value sufficiently great to cause the rotation angle $\alpha$ to equal 90 degrees.

A practical construction of the invention, as shown in Figs. 1 and 2, for modulating waves having a wavelength of 3 centimeters, has been found to be as follows: Inner dimensions of the waveguide 11, 0.4 x 0.9 inch; elements 13, 14 and 14', each 0.4 inch thick and shaped to completely fill the internal cross-section area of the waveguide; and coil 18, 2 inches long and comprising 100 turns of No. 18 copper wire. The modulator signal source 19 supplied, in the practical construction, a current of about 1 ampere at frequencies up to 40 kilocycles. Insertion loss of the device was about 5 db.

While a preferred embodiment of the invention has been shown and described, various other embodiments and modifications thereof will occur to those skilled in the art and will fall within the scope of invention as defined in the following claims.

What is claimed is:

1. A waveguide modulator comprising a rectangular waveguide, means providing polarized electromagnetic waves in said waveguide, an electrically non-conductive ferromagnetic material positioned within said waveguide in the path of said waves and filling a major portion of the cross-sectional area of said waveguide, and means providing a magnetic field in said material in substantial alignment with the major axis of said waveguide, whereby the plane of polarization of said waves is rotated when said waves pass through said material.

2. A waveguide modulator comprising a rectangular waveguide, means providing polarized electromagnetic waves in said waveguide, an electrically non-conductive ferromagnetic material positioned within said waveguide in the path of said waves and filling a major portion of the cross-sectional area of said waveguide, and a permanently magnetized electrically non-conductive ferromagnetic material positioned within said waveguide in the path of said waves and adjacent said first-named material to provide a magnetic field in the latter which is substantially in alignment with the major axis of said waveguide, whereby the plane of polarization of said waves is rotated when said waves pass through said first-named material.

3. A waveguide modulator comprising a rectangular waveguide, means providing polarized electromagnetic waves in said waveguide, an electrically non-conductive ferromagnetic material positioned within said waveguide in the path of said waves and filling a major portion of the cross-sectional area of said waveguide, at least one surface of said material being substantially flat and perpendicular to the major axis of said waveguide, and a permanently magnetized electrically non-conductive ferromagnetic material positioned adjacent said surface of said first-named material to provide a magnetic field in the latter which is substantially in alignment with said major axis, whereby the plane of polarization of said waves is rotated when said waves pass through said first-named material.

4. A waveguide modulator comprising a rectangular waveguide, means providing polarized electromagnetic waves in said waveguide, an electrically non-conductive ferromagnetic material positioned within said waveguide in the path of said waves and filling a major portion of the cross-sectional area of said waveguide, two opposite surfaces of said material being substantially flat and mutually parallel with respect to each other and perpendicular to the major axis of said waveguide, and a pair of permanently magnetized electrically non-conductive members of ferromagnetic material positioned respectively adjacent said opposite surfaces of said first-named material to provide a magnetic field in the latter which is substantially in alignment with said major axis, whereby the plane of polarization of said waves is rotated when said waves pass through said first-named material.

5. A waveguide modulator comprising a rectangular waveguide, means providing polarized electromagnetic waves in said waveguide, and a permanently magnetized electrically non-conductive ferromagnetic material positioned within said waveguide in the path of said waves and filling a major portion of the cross-sectional area of said waveguide, the magnetic field in said material being substantially in alignment with the major axis of said waveguide, whereby the plane of polarization of said waves is rotated when said waves pass through said material.

6. A waveguide modulator comprising a rectangular waveguide, means providing polarized electromagnetic waves in said waveguide, an electrically non-conductive ferromagnetic material positioned within said waveguide in the path of said waves and filling a major portion of the cross-sectional area of said waveguide, means providing a fixed magnetic field in said material in substantial alignment with the major axis of said waveguide, means providing a variable magnetic field in said material in substantial alignment with said major axis, and means connected to vary said variable magnetic field in accordance with desired modulation.

7. The modulator in accordance with claim 6, in which said means providing a variable magnetic field comprises a coil positioned outside said waveguide in the vicinity of said material, and in which said means connected to vary the variable magnetic field comprises a source of modulation signals connected to said coil.

References Cited in the file of this patent

UNITED STATES PATENTS 2,629,079    Miller _____ Feb. 17, 1953

OTHER REFERENCES

Microwave Resonance Absorption in Ferromagnetic Semiconductor, by Hewitt, Physical Review, vol. 72, No. 9, May 9, 1948.

Ferrite Applications at Microwave Frequencies, by Caswell Electronics, October 1953.

A Nonreciprocal Microwave Component, by Kales et al., Journal of Applied Physics, vol. 24, No. 6, June 1953.